United States Patent
Egami et al.

(10) Patent No.: US 9,650,947 B1
(45) Date of Patent: May 16, 2017

(54) AIR BYPASS VALVE

(71) Applicant: Nachi-Fujikoshi Corp., Toyama-shi, Toyama (JP)

(72) Inventors: Yuji Egami, Toyama (JP); Tokushi Yasoda, Toyama (JP)

(73) Assignee: Nachi-Fujikoshi Corp., Toyama (JP)

( * ) Notice: Subject to any disclaimer, the term of this patent is extended or adjusted under 35 U.S.C. 154(b) by 0 days.

(21) Appl. No.: 14/948,863

(22) Filed: Nov. 23, 2015

(51) Int. Cl.
| | |
|---|---|
| F16K 31/40 | (2006.01) |
| F02B 37/18 | (2006.01) |
| F16K 1/14 | (2006.01) |
| F16K 1/46 | (2006.01) |
| F16K 31/06 | (2006.01) |

(52) U.S. Cl.
CPC .............. F02B 37/183 (2013.01); F16K 1/14 (2013.01); F16K 1/465 (2013.01); F16K 31/0665 (2013.01); F16K 31/406 (2013.01)

(58) Field of Classification Search
CPC .... F02B 37/183; F16K 31/0665; F16K 1/465; F16K 1/14; F16K 31/40; F16K 31/406
USPC ...................... 251/30.01–30.05, 337; 60/611
See application file for complete search history.

(56) References Cited

U.S. PATENT DOCUMENTS

| | | | | |
|---|---|---|---|---|
| 4,310,142 A * | 1/1982 | Ludwig | .............. | F02M 37/0029 251/30.03 |
| 4,989,564 A * | 2/1991 | Cook | ...................... | F02M 3/075 251/30.03 |
| 5,810,330 A * | 9/1998 | Eith | ........................ | B60T 8/363 251/129.14 |
| 6,076,550 A * | 6/2000 | Hiraishi | .............. | F16K 31/0655 137/550 |
| 6,290,203 B1 * | 9/2001 | Kolze | .................... | F16K 31/402 251/30.02 |
| 6,682,316 B1 * | 1/2004 | Boke | ........................ | B67D 7/36 251/30.04 |
| 8,191,855 B2 * | 6/2012 | Hezel | ...................... | F02B 37/16 251/33 |
| 8,322,681 B2 * | 12/2012 | Bielaβ | ................ | F16K 31/0644 251/30.04 |
| 8,641,153 B2 * | 2/2014 | Voss | ........................ | B60T 8/363 137/269 |
| 2012/0313021 A1 * | 12/2012 | Da Pont | ................ | F16K 31/402 251/129.15 |
| 2012/0326065 A1 * | 12/2012 | Ferguson | ................ | B60T 8/363 251/129.15 |
| 2013/0098340 A1 * | 4/2013 | Zurke | ..................... | F02B 37/16 60/611 |

FOREIGN PATENT DOCUMENTS

| | | |
|---|---|---|
| WO | WO 2011/157457 | 12/2011 |
| WO | WO 2011/157521 | 12/2011 |

* cited by examiner

*Primary Examiner* — John Bastianelli
(74) *Attorney, Agent, or Firm* — Harness, Dickey & Pierce, PLC

(57) ABSTRACT

In order to prevent deterioration of sliding performance of a piston and center core misalignment of the piston when the piston moves for its stroke, there is provided an air bypass valve including: a coil casing in which a coil is accommodated; a pilot valve section covered by the coil casing and having a movable iron core inserted in the coil; and a piston section fitted in the coil casing and having a piston with a hole. The air bypass valve further includes a protrusion provided at an edge of an opening portion of the piston casing which constitutes the piston section.

4 Claims, 4 Drawing Sheets

AIR BYPASS VALVE

BACKGROUND OF THE INVENTION (1) Field of the Invention

The present invention relates to an air bypass valve, and more particularly to a valve body (valve) which is installed in a turbocharger (supercharging device) for an internal combustion engine of an automobile to release exhaust gas.

(2) Description of Related Art

Conventionally, as disclosed in WO 2011/157457 and WO 2011/157521, an air bypass valve provided in a supercharging device for an internal combustion engine of an automobile is arranged in a bypass passage 8 (the reference numeral corresponds to that recited in WO 2011/157457, and the same applies below) between an intake-side passage 14 and an exhaust-side passage 12 of the supercharging device. This type of air bypass valve 1 has a solenoid valve 4, a bypass valve 2 with a pneumatically-operable valve closing body 10, and a control pressure chamber 24. It is described in WO 2011/157457 and WO 2011/157521 that the air bypass valve 1 can form fluid connection between the exhaust-side passage 12 and the intake-side passage 14 of the supercharging device via the control pressure chamber 24 by energization of the solenoid valve 4 during an opening process of the bypass valve 2.

BRIEF SUMMARY OF THE INVENTION

However, in WO 2011/157457, if the length of the valve closing body 10 (hereinafter referred to as a piston) is not less than a predetermined length, shaft misalignment (center core misalignment) of the piston in the axial direction may occur due to repeated sliding of the piston. As a result, the piston can no longer completely close the exhaust-side passage 12 of the supercharging device shown in WO 2011/157457 and WO 2011/157521, and therefore there has been the problem of causing failure in sealing of a sealing member such as a packing.

To prevent such center core misalignment in the axial direction of the piston, it is possible to provide a part which guides the circumference of the piston depending on the length of the piston. Specifically, the part for guiding the piston (hereinafter referred to as a piston casing) is provided over the entire circumference of the piston with a length corresponding to the length of the piston.

However, sliding resistance is caused (when the piston moves for its stroke) by friction between the piston and the piston casing when the piston moves for its stroke, and therefor the problem of deteriorating the sliding performance of the piston has occurred.

The present invention is thus made for solving the above problems. That is, an object of the present invention is to provide an air bypass valve which prevents deterioration of the sliding performance of the piston when the piston moves for its stroke, and the center core misalignment of the piston when the piston moves for its stroke.

To solve the above problems, the air bypass valve of the present invention is mainly composed of: a coil casing accommodating a coil therein; a pilot valve section covered by the coil casing and having a movable iron core inserted into the coil; and a piston section fitted in the coil casing and having a piston with a hole. In addition, the piston section includes the piston, a first spring accommodated in the piston, and a piston casing covering an outer periphery of the piston and having an opening portion.

The pilot valve section includes: the coil in which a copper wire is wound around a hollow cylindrical bobbin; a fixed iron core inserted into an inner diametrical part of the coil from one end side thereof; the movable iron core inserted into the inner diametrical part of the coil from the other end side thereof and having recesses at both ends thereof; a yoke inserted into a clearance between the inner diametrical part of the coil and the movable iron core; a second spring accommodated in the recess on one end side of the movable iron core; a steel ball accommodated in the recess on the other end side of the movable iron core; a valve seat disposed so as to face the other end side of the movable iron core; and a seat holder accommodating the valve seat and the steel ball therein and having a through-hole. The air bypass valve of the present invention is characterized in that a protrusion is provided at an edge of the opening portion of the above-mentioned piston casing.

The clearance between the above-mentioned seat holder and piston casing is sealed with a sealing member. If this sealing member is made of resin, its linear expansion coefficient is generally larger than that of the piston casing. Accordingly, when an atmosphere around the air bypass valve reaches a relatively high temperature, for example, reaches 220° C., the piston casing expands and the seal member tends to expand more than the piston casing. At that time, the sealing member follows the shape of the piston casing and thereby maintains its sealing performance. However, under the high-temperature atmosphere, an outer diametrical part of the sealing member develops creep deformation in conformity with the shape of the piston casing.

Therefore, when an ambient temperature of the air bypass valve becomes a normal temperature from the high temperature, there is caused the difference in contraction amount between the sealing member and the piston casing due to the difference linear expansion coefficient between the sealing member and the piston casing. As a result, a clearance, which originally did not exist, is generated at a fitting part between the piston casing and the sealing member. Due to this clearance, gas leaks from the clearance between the piston casing and the sealing member, which may eventually deteriorate the sealing performance of the air bypass valve against the valve body.

Therefore, in the air bypass valve of the present invention, it is also possible to provide a sealing member between the piston and the piston casing, and fix the sealing member with the seat holder.

Further, in the case where a leading end (opposite to a bottom) of the piston of the air bypass valve has an edged shape, an internal space of the piston section is divided by the piston when the piston moves to an upper dead point of its stroke, so that the response performance of the stroke of the piston may be deteriorated. Therefore, in the air bypass valve of the present invention, it is also possible to provide a notch at the edge of the leading end of the piston.

Furthermore, in an environment where the air bypass valve is installed in a supercharging device, oil contents are often included in gas which enters and/or exit the air bypass valve. Accordingly, if the oil contents included in the gas adheres to the piston, the oil contents will move along the bottom of the piston. As a result, the hole provided at the bottom of the piston is clogged with the oil contents, which may cause malfunction of the piston. Therefore, in the air bypass valve of the present invention, it is also possible to form a periphery of the hole provided at the bottom of the piston in a protruding shape (with a bulge).

As described above, the air bypass valve of the present invention has the structure in which a plurality of protrusions are provided at the edge of the opening at the bottom of the piston casing. Owing to this structure, these protrusions serve to guide the piston to the extent of their length when the piston moves for its stroke. Thus, deterioration of the sliding performance of the piston when the piston moves for its stroke is prevented. At the same time, since these protrusions serve to guide the periphery of the piston, center core misalignment of the piston when the piston moves for its stroke is prevented. Consequently, the sealing (closing) function between the piston and a valve body, which is a component of the supercharger, can also be maintained when the piston descends to its lower dead point.

The air bypass valve of the present invention has the structure in which the sealing member is provided between the piston and the piston casing, and the sealing member is fixed by the seat holder. Owing to this structure, even if the temperature around the air bypass valve reaches a relatively high temperature, the sealing function of the fitting portion between the seat holder and the sealing member can be maintained. Accordingly, even if the sealing member and the piston casing generate thermal expansion or thermal contraction, the gas can be prevented from entering and/or exiting from the outside of the sealing member.

Further, the air bypass valve of the present invention has the structure in which the notch is provided at the edge of the leading end of the piston. Owing to this structure, when the piston moves for its stroke, the entry and exit of the gas into and from the piston chamber is secured through the notch. Consequently, even when the piston moves an upper dead point of its stroke, the response performance of the stroke of the piston can be maintained.

Furthermore, the air bypass valve of the present invention has the structure in which the periphery of the hole provided at the bottom of the piston is formed in a shape protruding toward the outside. Owing to this structure, oil and contaminants are prevented from entering through the hole into the piston chamber. Consequently, the hole of the piston is free of clogging with oil or contaminants, and a flow of gas entering/exiting through the hole can be secured, so that the response performance of the stroke of the piston can be maintained.

DETAILED DESCRIPTION OF THE INVENTION

Figure 1:
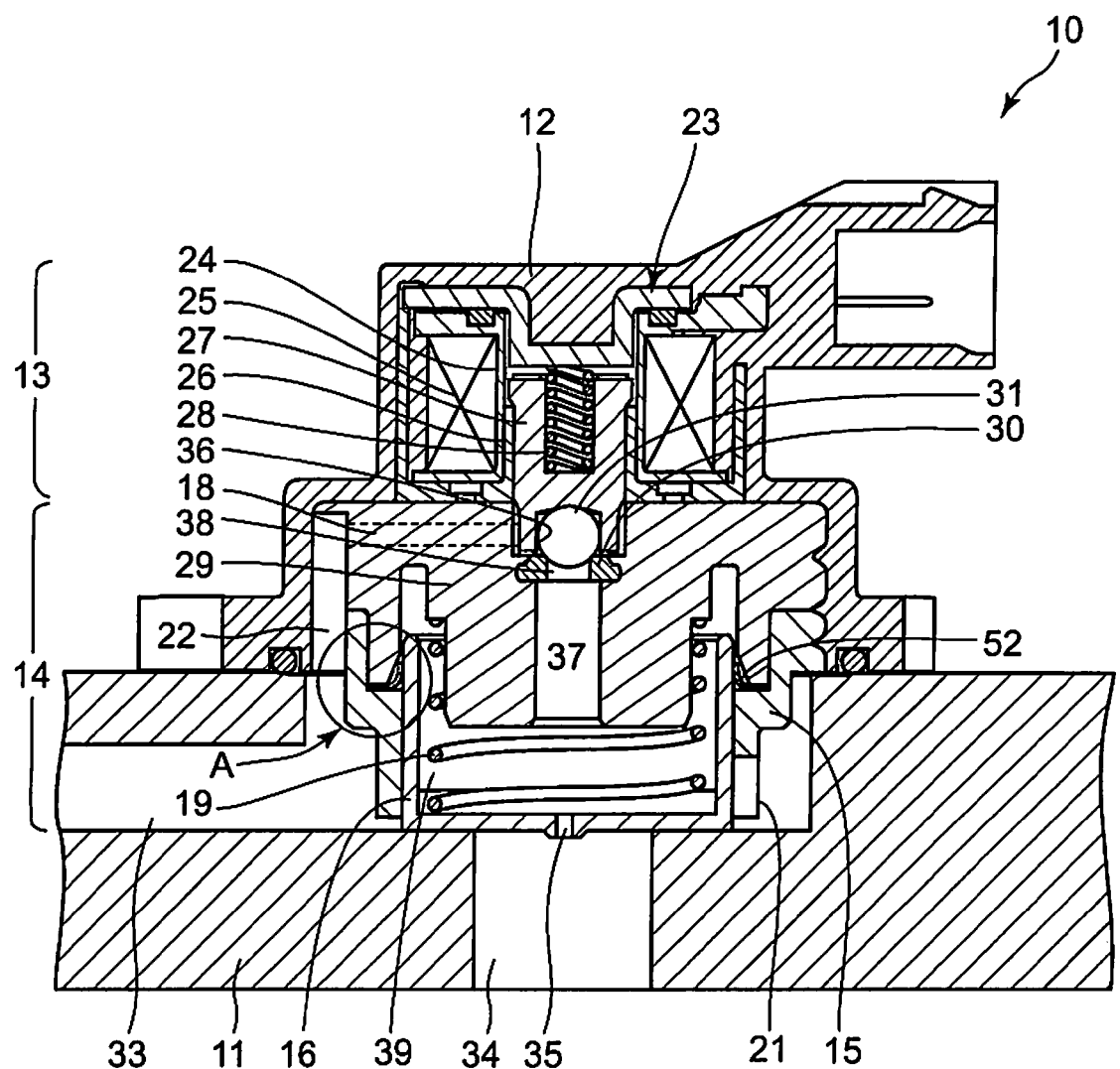
FIG. 1 is a longitudinal cross-sectional view showing a schematic structure of an air bypass valve 10 according to an embodiment of the present invention.

Hereinafter, an air bypass valve according to an embodiment of the present invention will be described in detail with reference to the accompanying drawings. FIG. 1 is a longitudinal cross-sectional view showing a schematic structure of the air bypass valve 10 according to the embodiment of the present invention. As shown in FIG. 1, the air bypass valve 10 is mainly composed of a coil casing 12 accommodating a coil 25 therein, a pilot valve section 13 including a movable iron core (plunger) 27 inserted into the cylindrical coil 25, and a piston section 14 which includes a closed-end piston 16 with a hole 35 and is fitted in the coil casing 12.

First, the configuration of the pilot valve section 13 will be described. The pilot valve section 13 is covered by the coil casing 12, and is formed around the coil 25. The coil 25 is a component in which a copper wire is wound around a hollow cylindrical bobbin 24 having collars at both ends. A part of a fixed iron core 23 is inserted into the inner diametrical part of this coil 25, i.e., the inner diametrical part of the bobbin 24, from one end side. A part of the movable iron core 27 is inserted into the inner diametrical part of the bobbin 24 from the other end side. The fixed iron core 23 has a collar, and is substantially U-shaped in cross-section. The movable iron core 27 is shaped to have recesses at both ends. A yoke 26 is inserted into the clearance between the inner diametrical part of the bobbin 24 and the movable iron core 27.

A second spring 28 is accommodated inside the recess on one end side of the movable iron core 27, and the second spring 28 is pressed down by the end of the fixed iron core 23. As mentioned above, another recess 36 is provided on the other end side (the side opposite to the recess where the second spring 28 is accommodated) of the movable iron core 27. A valve seat 30 having a through-hole 38 is disposed at a position facing the other recess 36. A steel ball 31 is held from both sides by the recess 36 provided on the other end side of the movable iron core 27 and the through-hole 38 of the valve seat 30.

As mentioned above, the valve seat 30 is provided with the through-hole 38 which is connected with a through-hole 37 formed in a seat holder 29 described later. The steel ball 31 functions as a sealing member for the pilot valve section 13. For this purpose, the steel ball 31 is inserted into the recess 36 formed on the one end side of the movable iron core 27 and then integrated with the movable iron core 27 by press-fitting or caulking, so that the steel ball 31 does not fall out of the movable iron core 27. The seal for the valve seat 30 has a conical or hemispherical cross-section, so that the contact part between a spherical surface of the steel ball 31 and an inner circumferential surface of the valve seat 30 has a linear shape. Thus, the sealing performance at the contact part between the steel ball 31 and the valve seat 30 is favorable, and it is effective against ingress of contaminants as well.

The valve seat 30, the steel ball 31, and a part of the movable iron core 27 are accommodated in the seat holder 29 including a recess. This seat holder 29 is provided with a first drain port 18 branched from the recess, and this first drain port 18 is further connected to a second drain port 22 and finally leads to the outside of the air bypass valve 10. The ratio of the hole diameter of the through-hole 38 formed in the valve seat 30 relative to the diameter of the steel ball 31 is preferably set within the range of 0.5 to 0.75.

Next, the configuration of the piston section 14 will be described. The piston section 14 is formed with the closed-end piston 16 having the hole 35, as a center. The piston casing 15 covering the outer periphery of the piston 16 and the above-described seat holder 29 are coupled with each other, and in the integrated state, fitted on the inner circumferential surface of the coil casing 12. A first spring 19 is accommodated in a piston chamber 39 which is the interior of the piston 16. Thus, the through-hole 37 of the seat holder 29, the piston chamber 39, and the hole 35 of the piston 16 are spatially connected with one another.

Figure 2:
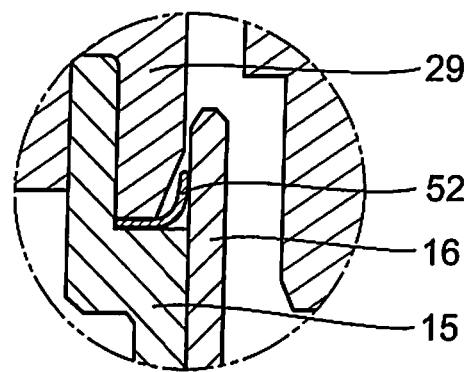
FIG. 2 is an enlarged detailed view of part A shown in FIG. 1.

FIG. 2 is an enlarged detailed view of the part A shown in FIG. 1. As shown in FIG. 2, a sealing member 52 having an L-shaped cross-section is installed in the fitting part among the piston casing 15, the piston 16, and the seat holder 29. The inner side in the axial direction of the sealing member 52 is in contact with the outer circumferential surface of the piston 16, and a part of the upper and lower surfaces of the sealing member 52 is held between the seat holder 29 and the piston casing 15. Owing to this configuration, even if the ambient temperature of the air bypass valve 10 changes, entry/exit of gas from the outside of the sealing member 52 can be prevented through the difference in thermal contractility between the sealing member 52 and the piston casing 15.

Figure 3:
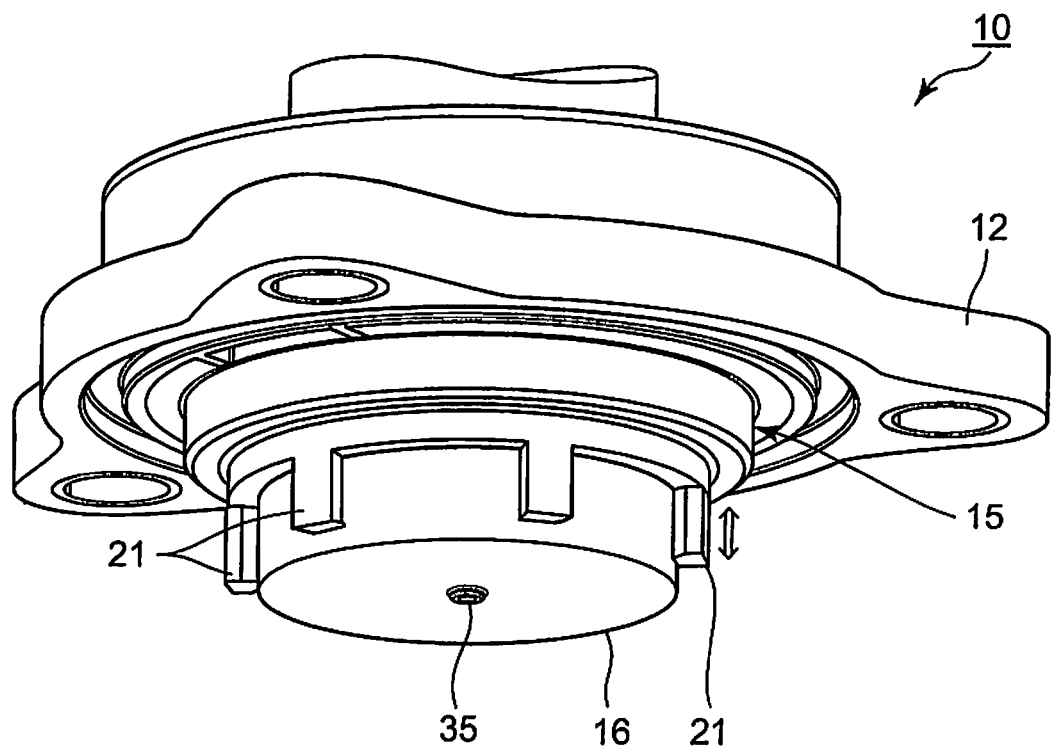
FIG. 3 is a perspective view of the air bypass valve 10 shown in FIG. 1 as seen from the side of a piston 16.

FIG. 3 is a perspective view of the air bypass valve 10 shown in FIG. 1 as seen from the side of the piston 16. As shown in FIG. 3, the piston 16 is fitted on the inner side of the piston casing 15, and can freely slide along the piston casing 15 in the directions of the double-headed arrow shown in FIG. 3. The piston 16 is guided by protrusions 21 formed at the edge of the opening portion of the piston casing 15.

As shown in FIG. 3, a plurality, at least three or more, of the protrusion 21 are provided in the circumferential direction of the edge of the opening portion of the piston casing 15. This structure allows the air bypass valve to prevent sliding failure or center core misalignment of the piston 16 and thereby maintain its response performance as a valve. To reduce the sliding resistance on the inner diametrical side which comes into contact with the piston 16, it is also possible to round the inner side of the protrusions 21.

As shown in FIG. 1 and FIG. 3, the periphery on one side (especially on the outer side) in the axial direction of the hole 35 of the piston 16 is formed in a protruding shape (the periphery is raised). Therefore, the oil running from the outer side of the piston 16 is less likely to enter the hole 35, and clogging of the hole 35 can be prevented.

Figure 4:
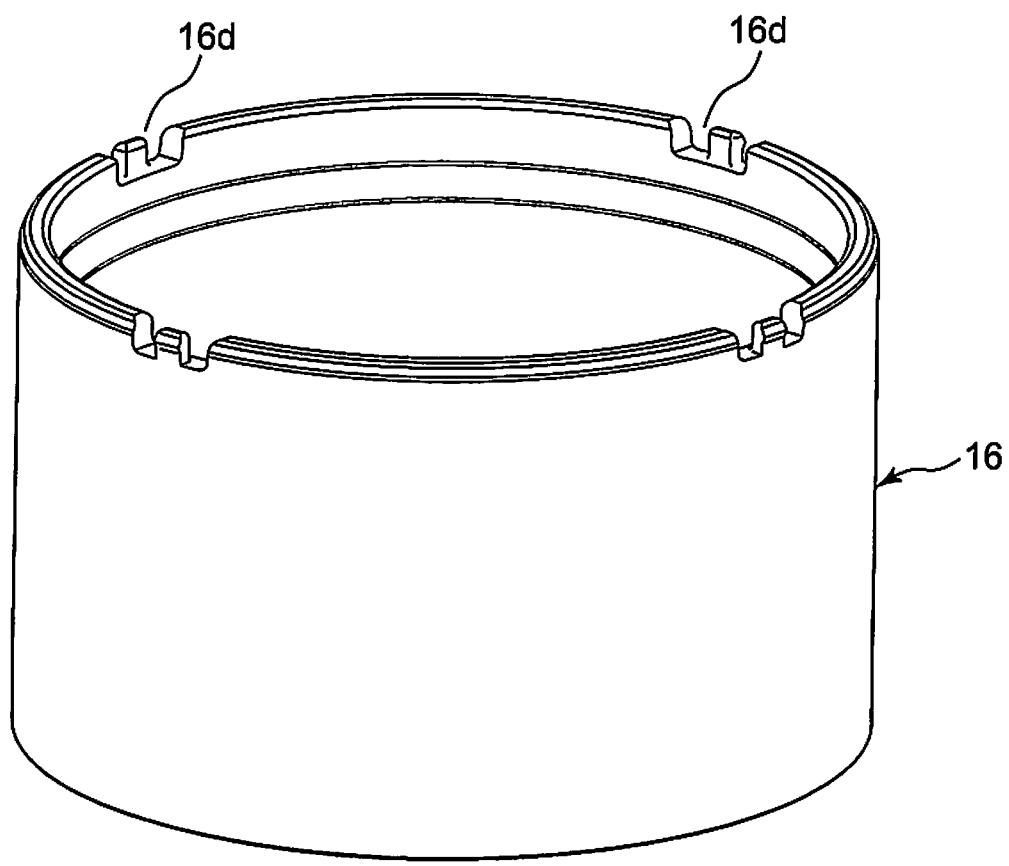
FIG. 4 is an overall perspective view of the piston 16 shown in FIG. 1 and FIG. 3, seen from above.

FIG. 4 shows an overall perspective view, seen from above (the leading end side), of the piston 16 shown in FIG. 1 and FIG. 3. As shown in FIG. 4, it is also possible to provide a notch 16d at the edge of the leading end of the piston 16 (the upper part in the sheet of FIG. 4), at a plurality of positions in the radial direction of the piston 16. Owing to this structure, even when the piston 16 of the air bypass valve 10 reaches the stroke end (in a state where the piston 16 shown in FIG. 1 has moved to the uppermost position), the gas can enter and exit the piston chamber 39 through the notches 16d, so that response delay of the air bypass valve as a valve can be prevented.

Figure 5:
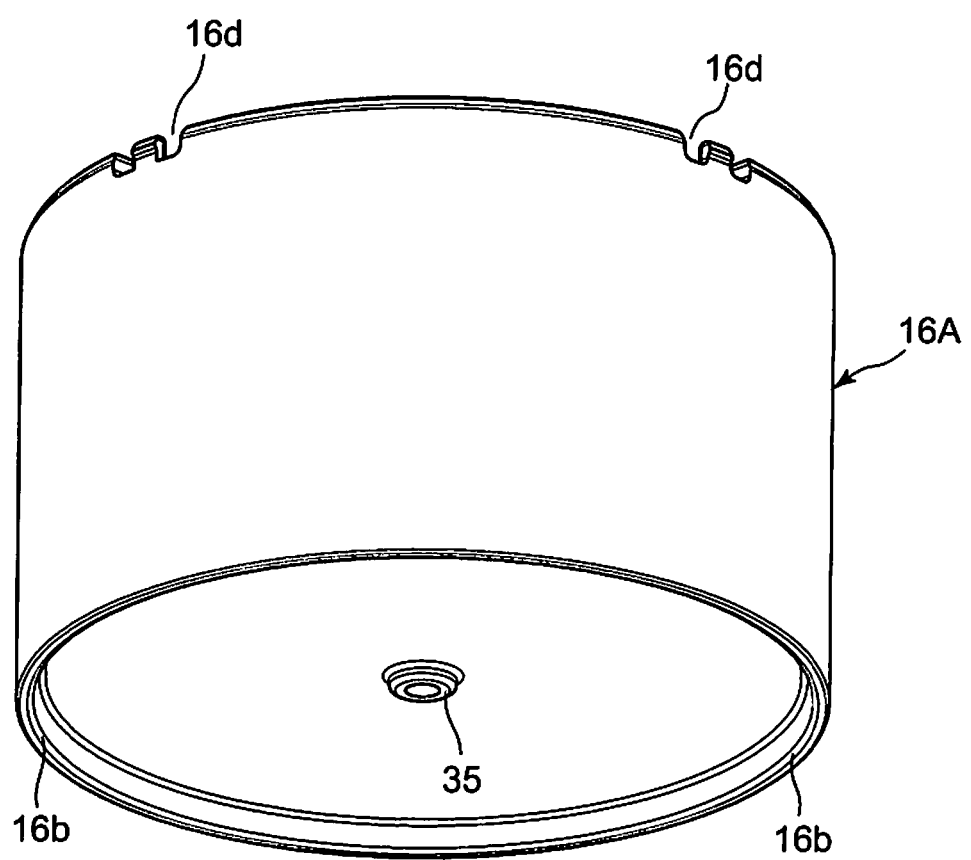
FIG. 5 is an overall perspective view of a piston 16A of a different form from the piston 16 shown in FIG. 4, seen from below.

FIG. 5 shows a perspective view, seen from below, of a piston 16A of another form than the piston 16 shown in FIG. 4. The piston 16A differs from the piston 16 shown in FIG. 4 in that the piston 16A is provided with a step 16b at the edge of the bottom of the piston 16A as shown in FIG. 5. This step 16b provided in the piston 16A serves to prevent ingress of contaminants from the outside of the air bypass valve 10.

That is, in the piston 16 shown in FIG. 4, when the piston 16 comes into contact with the valve body 11 as shown in FIG. 1, the bottom surface of the piston 16 and a passage inside the valve body 11 come into contact with each other. If the contact state is achieved by surfaces, the risk of inclusion of contaminants between the surfaces is higher, whereas if contaminants are included between the contact surfaces, the sealing performance between the piston 16 and the valve body 11 deteriorates.

Therefore, the edge of the bottom of the piston 16A shown in FIG. 5 is given a stepped shape so that the piston 16A and the valve body 11 come into contact with each other in a manner of line contact. As a result, the risk of inclusion of contaminants in this contact part decreases, and the sealing performance can be maintained.

The air bypass valve 10 according to this embodiment is configured basically as described above. Next, the operation of the air bypass valve 10 will be described. When the pilot valve section 13 of the air bypass valve 10 is energized from an external power source, an electromagnetic force generated in the coil 25 causes the movable iron core (plunger) 27 to move upward in the sheet of FIG. 1. When the movable iron core 27 moves upward, the steel ball 31, which is integrally fitted in the recess 36 of the movable iron core 27, is separated from the valve seat 30. As a result, the piston chamber 39, the through-hole 37 of the seat holder 29 and the first drain port 18 are connected with each other.

The pressure inside the piston chamber 39 is higher than the pressure inside an intake passage 33 of the valve body 11, and therefore the gas in the piston chamber 39 is discharged into the intake passage 33 of the valve body 11 via the first drain port 18 and the second drain port 22. At that time, the gas in an exhaust passage 34 of the valve body 11 flows into the piston chamber 39 through the hole 35 of the piston 16.

The air bypass valve 10 of the present invention is designed such that an opening area of the pilot valve section 13 that is defined by the stroke of the movable iron core 27 and the through-hole 38 of the valve seat 30 is larger than the cross-sectional area of the hole 35 of the piston 16. Accordingly, the amount of gas flowing out from the inside of the piston chamber 39 toward the side of the intake passage 33 of the valve body 11 is larger than the amount of gas flowing from the side of the exhaust passage 34 of the valve body 11 into the piston chamber 39 through the hole 35 thereof.

Accordingly, the pressure in the piston chamber 39 decreases, and an upward force of the piston 16 occurs due to the differential pressure between the inside of the piston chamber 39 and the inside of the exhaust passage 34 of the valve body 11. Thus, the piston 16 is separated from the valve body 11, so that the exhaust passage 34 and the intake passage 33 of the valve body 11 are spatially connected with each other.

On the contrary, when the pilot valve section 13 is not energized, the electromagnetic force of the pilot valve section 13 is lost (disappears), and the movable iron core 27 moves downward as shown in FIG. 1 due to the elastic force of the second spring 28, bringing the steel ball 31 integrated with the movable iron core 27 into contact with the valve seat 30. Thus, the piston chamber 39 and the first drain port 18 are disconnected from each other.

As a result, the gas in the exhaust passage 34 of the valve body 11 flows into the piston chamber 39 through the hole 35 of the piston 16, and the pressure of the exhaust passage 34 and the pressure inside the piston chamber 39 become equal to each other. As a result, the piston 16 moves downward as shown in FIG. 1 due to the elastic force of the first spring 19, and the bottom surface of the piston 16 comes into contact with the valve body 11.

Optionally, a filter for preventing ingress of contaminants can be fitted on the lower surface of the piston 16A shown in FIG. 5, or between the valve seat 30 and the recessed surface of the seat holder 29. The filter may be fixed to the piston 16A shown in FIG. 5 by means of ultrasonic welding.

For integrating the filter with the valve seat 30, the filter may be fixed by means of caulking or insert molding.

Alternatively, it is also possible to separate the filter from the valve seat 30 and fix the filter on the bottom surface of the seat holder 29 using the ultrasonic welding.

The invention claimed is:

1. An air bypass valve comprising:
   a coil casing in which a coil is accommodated;
   a pilot valve section covered by the coil casing, the pilot valve section comprising a movable iron core inserted into the coil; and
   a piston section fitted in the coil casing, the piston section comprising a piston having a hole at a bottom thereof, wherein
   the piston section comprises:
     the piston;
     a first spring accommodated in the piston; and
     a piston casing having an opening portion formed to cover an outer periphery of the piston,
   the pilot valve section comprises:
     the coil in which a copper wire is wound around a hollow cylindrical bobbin;
     a fixed iron core inserted into an inner diametrical part of the coil from one end side thereof;
     the movable iron core inserted into the inner diametrical part of the coil from the other end side thereof, the movable iron core comprising recesses at both ends;
     a yoke inserted into a clearance between the inner diametrical part of the coil and the movable iron core;
     a second spring accommodated in the recess on one end side of the movable iron core;
     a steel ball accommodated in the recess on the other end side of the movable iron core;
     a valve seat disposed so as to face the other end side of the movable iron core; and
     a seat holder having a through-hole, the valve seat and the steel ball being accommodated in the seat holder, and
   a protrusion is provided at an edge of the opening portion of the piston casing.

2. The air bypass valve according to claim 1, wherein a sealing member is provided between the piston and the piston casing, and the sealing member is fixed by the seat holder.

3. The air bypass valve according to claim 1, wherein a notch is provided at an edge of a leading end of the piston.

4. The air bypass valve according to claim 1, wherein a periphery of the hole of the piston is formed in a protruding shape.

* * * * *